(12) United States Patent
Sun et al.

(10) Patent No.: US 6,741,593 B1
(45) Date of Patent: May 25, 2004

(54) CIRCUIT ARCHITECTURE AND METHOD FOR DISPLAYING PORT STATUS IN DATA COMMUNICATIONS SWITCHING SYSTEM

(75) Inventors: Peter C. P. Sun, San Jose, CA (US); Wallace Lin, San Jose, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 09/239,210

(22) Filed: Jan. 28, 1999

Related U.S. Application Data
(60) Provisional application No. 60/112,914, filed on Dec. 18, 1998.

(51) Int. Cl.[7] .............................................. H04L 12/28
(52) U.S. Cl. ................................. 370/392; 340/815.45
(58) Field of Search ............................... 370/392, 389, 370/235, 396, 400, 401, 412, 413, 415, 417, 419, 352, 390, 402, 422; 709/231, 244; 340/815.4, 815.45, 815.63

(56) References Cited

U.S. PATENT DOCUMENTS

| | | | | |
|---|---|---|---|---|
| 6,058,427 A | * | 5/2000 | Viswanath et al. | 709/231 |
| 6,181,702 B1 | * | 1/2001 | Egbert | 370/401 |
| 6,243,020 B1 | * | 6/2001 | Lam et al. | 340/815.4 |
| 6,400,715 B1 | * | 6/2002 | Beaudoin et al. | 370/392 |

* cited by examiner

*Primary Examiner*—Phirin Sam
(74) *Attorney, Agent, or Firm*—Joe Zheng; C. P. Chang (57) ABSTRACT

A system for displaying statuses for multiple signal paths or ports on LEDs is disclosed. The system comprising a plurality of shift circuits receives a data signal comprising groups of status signals. The data signal is serially shifted from one shift circuit to another so as to parse the status signals to be displayed on appropriate LEDs designated for each of the signal paths or ports. As a result, multiple statuses can be effectively displayed in real time using a minimum number of LEDs.

20 Claims, 8 Drawing Sheets

CIRCUIT ARCHITECTURE AND METHOD FOR DISPLAYING PORT STATUS IN DATA COMMUNICATIONS SWITCHING SYSTEM

CROSS REFERENCE TO RELATED APPLICATION

This application claims the benefit of U.S. Provisional Application entitled "Architecture of Data Communications Switching system and Associated Method", Ser. No.: 60/112,914, filed on Dec. 18, 1998, the content of which is hereby incorporated by reference for all purposes in its entirety.

BACKGROUND OF THE INVENTION

1. Field of the Invention

The present invention generally relates to data communication systems. More specifically, the present invention relates to a circuit architecture and method for displaying port status in real time using a minimum number of LED indicators.

2. Description of the Related Art

In data communications, a switch system is a network device that selects a path or circuit for sending a unit of data to its next destination. A switch system may also include the function of a router, a device or program that can determine the route and specifically what adjacent network point the data should be sent to. In general, a switch system is a simpler and faster mechanism than a router, which requires knowledge about the network and how to determine the route.

On larger networks, the trip from one switch point to another in the network is called a hop. The time a switch system takes to figure out where to forward a data unit is called the latency which is typically measured between the first bit of an input (inbound) packet and the first bit of a corresponding output (outbound) packet. In a multi-port switch system, the latency is measured between the first bit of an input packet and the first bit of a corresponding output packet to the last one of the multiple output ports. In reality, one of the factors that determines the cost and performance of a switch system is largely the latency. A system with low latency generally warrants a high price tag. There is therefore a great need for a switch system that has minimum latency but is low cost.

Often a user of such system, typically a system administrator, needs to know in real time the status of each port in the system. LED indicators are often used in this regard, for example, an LED indicator for port speed is "on" to indicate one data baud rate going through a port and "off" to indicate another data baud rate going through the port. If the number of statuses that need to display to a user is large, there would be a forbidden number of such LED indicators. Thus there is another need for such system to provide an efficient visual monitoring means to indicate all necessary statuses with a minimum number of LED indicators.

SUMMARY OF THE INVENTION

The present invention has been made in consideration of the above described problems and needs and has particular applications in switch systems with multiple signal paths or ports. In many cases, a user of a switch system, typically a system administrator, needs to know the status of each of the ports, for example, the buffer status and the data speed thereof. The present invention discloses a method and circuit architecture for displaying such status using a minimum number of display indicators and can be advantageously used in systems with multiple signal paths and ports.

The display system including the circuit architecture and method comprises a plurality of shift circuits and further receives a data signal comprising groups of status signals. The data signal is serially shifted from one shift circuit to another so as to parse the status signals to be displayed on appropriate LEDs designated for each of the signal paths or ports. As a result, multiple statuses can be effectively displayed in real time using a minimum number of LEDs.

According to one embodiment, the present invention is a method for displaying port statuses of a switch system having N ports, the method comprising:

receiving a clocking signal and a data signal, the data signal comprising M groups of status information; each of the M groups of status information comprising N status signals, each of the N status signals corresponding to one of the N ports of the switch system;

providing the data signal to M shift circuits connected in series; each of the M shift circuits providing N outputs; wherein the N outputs are respectively coupled to N display indicators, each for one of the N ports of the switch system;

shifting the data signal through the M shift circuits in synchronization with the clocking signal; and causing N status signals to be displayed on the N indicators respectively through the N outputs of the each of the M shift circuits.

According to another embodiment, the present invention is a circuit architecture for displaying port statuses of a switch system having N ports, the circuit architecture comprising:

M LEDs for each of the N ports so that there are N×M such LEDs;

M shift circuits connected in series and receiving a clocking signal and a data signal, the data signal comprising M groups of status signals and provided by a display interface in the switch system;

each of the M shift circuits comprising N local shift registers and each of the local shift registers coupled to one of the LEDs for each of the N ports;

wherein one of the groups of status signals are respectively displayed on each of the LEDs for the N ports when the data signal is serially shifted from one of the shift circuits to another one of the shift circuits according to the clocking signal; and wherein each of the status signals in the one of the groups of status signals is displayed on one of the display indicators when the one of the groups of status signals is serially shifted from one of the local shift registers to another one of the local shift registers according to the clocking signal.

There are many advantages and benefits in the present invention. One of them is the reduced complexity of real-time display of the statuses for all the ports. The circuit architecture can be now simply implemented with a series of shift registers together with a data signal comprising groups of status signals provided periodically from the display interface. By serially shifting the data signal, status signals can be parsed and respectively displayed on appropriate LEDs designated to each of the ports.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

Figure 1:
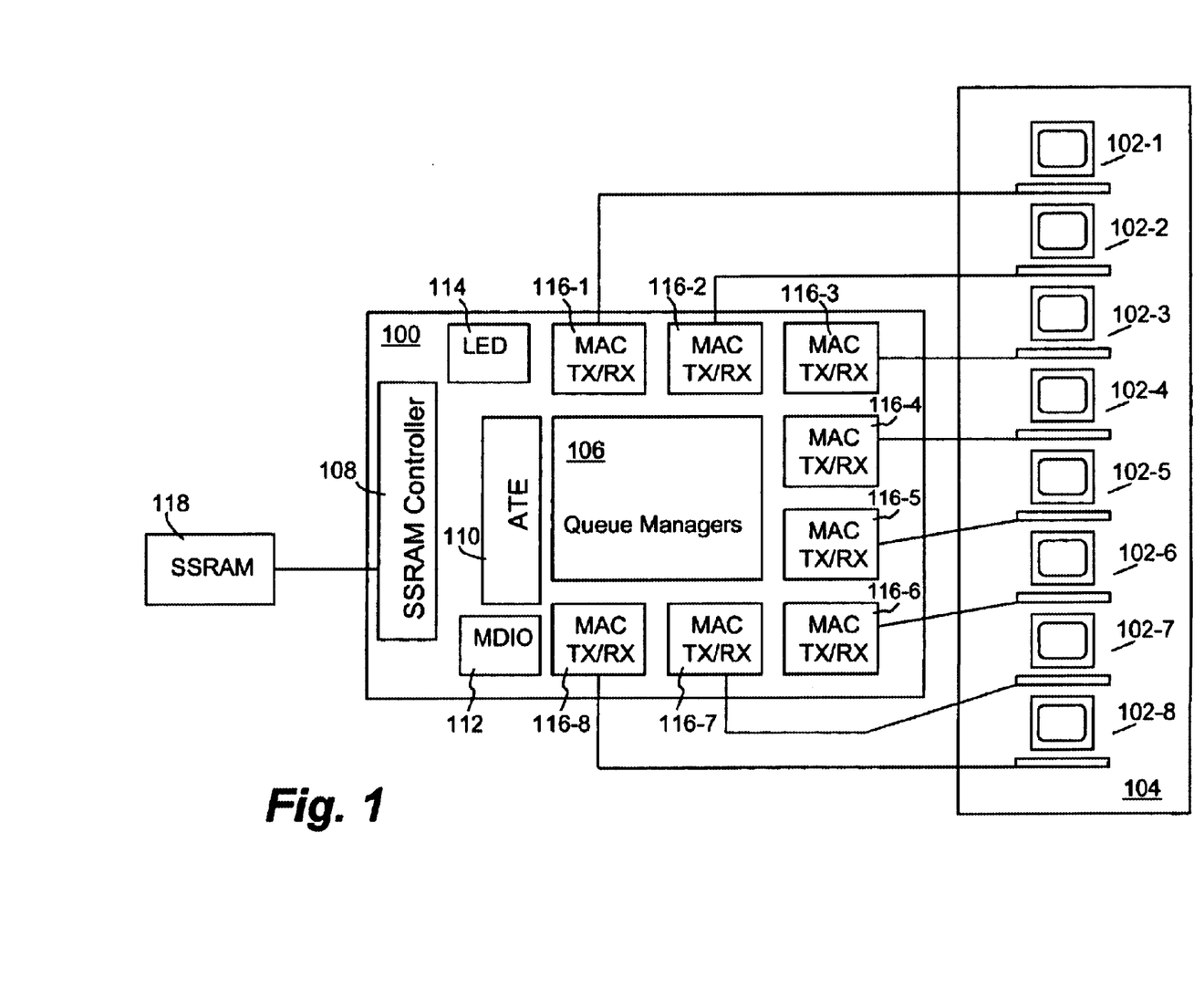
FIG. 1 illustrates a systematic overview of a configuration in which the present invention is practiced.

Referring now to the drawings, in which like numerals refer to like parts throughout the several views. FIG. 1 illustrates a simplified systematic overview of a configuration in which the present invention is practiced. Switch system 100 is a standalone fast switch/hub controller that facilitates data flow from and to one or more stations 102 on network 104. Network 104, for example, a local area network (LAN), typically comprises a large number of stations, computers and peripherals that are coupled together via systems like switch system 100 in order to exchange data with the network and further network 104 may be coupled to the Internet via a firewall server.

Data or messages designated for one or more stations on a network are referred to as unicast or multicast. An unicast message comprises a destination address of an intended recipient station on the network. Similarly, a multicast message comprises one or more respective destination addresses of intended recipient stations that are coupled to the network. Examples of an unicast or multicast message may include an electronic mail (email) from one location to one or multiple locations.

Data or messages designated for all stations on a network are referred to as broadcast messages. A broadcast message is sent in the same manner of any other message, but rather than designates an individual destination address, the message contains a broadcast indication that indicates to a switch system to broadcast the message to all the stations coupled to the switch system. Typically a switch system is coupled to other switch systems and therefore all of the nodes on the network read and process the broadcast message. Examples of a broadcast message may include a system message typically sent from a station operated by a system administrator.

As used herein, a message and a packet are generally interchangeably referred unless otherwise specifically distinguished. It is nevertheless understood that all messages or data are communicated in the form of packets. Further a data packet or packet for unicast is referred to as a unicast packet and for broadcast is referred to as a broadcast packet or sometimes as a multicast packet as well.

According to one embodiment, switch system 100 comprises eight media access controllers (MAC) respectively controlling eight physical layer ports, hence collectively referred to as MAC ports 116. All ports are bidirectional, serving as both input ports or output ports depending on the flowing direction of a packet. When network 104 is in operation, at any time, a packet arriving at switch system 100 can be either a unicast packet or a broadcast packet. Typically, by examining a first few bits of the packet, the receiving MAC port can detect if an arrived message is a unicast packet or a broadcast packet before routing the packet to a temporary storage. Other functions a MAC port may perform include a verification of a received packet to ensure that the packet is non-corrupted and measurement of the packet length.

Figure 2:
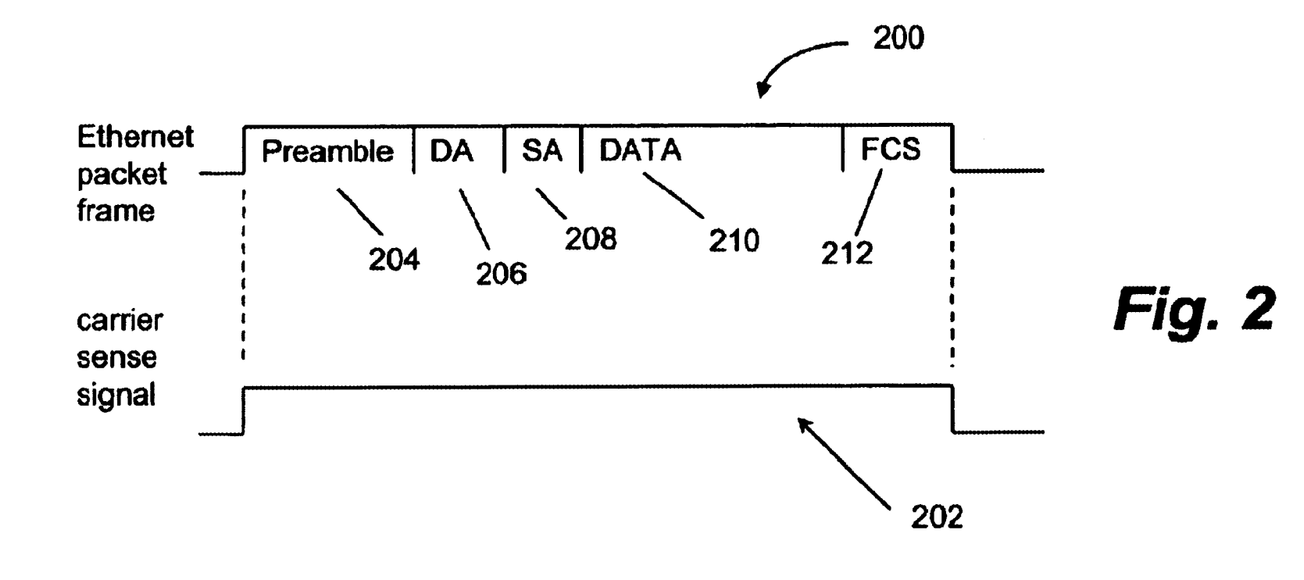
FIG. 2 depicts a structure of a packet along with a carrier sense signal.

Prior to the further detailed description of switch system 100, it is deemed necessary to examine an arrived message (packet). Referring now to FIG. 2, there is depicted a structure of a packet 200 along with a carrier sense signal 202. A packet is the unit of data or message that is routed between an origin station and a destination station on a data network, typically being a packet-switched network such as the Ethernet. When any file (e-mail message, HTML file, GIF file, URL request, and so forth) is sent from one place to another on the network, a protocol layer, such as Transport Control Protocol (TCP), divides the file into "chunks" of an efficient size for routing and efficient transmission in the network. The individually and sequentially transmitted packets are eventually grouped back to the original data format at the destination.

Each of these packets includes a header or preamble 204, destination address (DA) information 206, source address (SA) information 208, a sequence of transmitting data 210 and error control information such as frame check sum (FCS) 212. The length of the packet is at least 64 bytes long and normally not longer than 1518 bytes depending on the length of the transmitting data carried therein.

DA information 206 indicates to system 100 of FIG. 1 what this particular packet is for. Generally if DA information 206 comprises one or more addresses, that means the packet is a unicast or multicast packet and for designated stations on the network. If DA information 206 provides no specific address but an indication for broadcasting, the packet is a broadcast packet for every station on the network.

A carrier sense signal 202 is typically generated in a MAC port per each packet and asserted at the beginning of packet 200 when the packet is arrived at the MAC port of a switch system. Carrier sense signal 202 lasts through packet 200 and vanishes upon the completion of packet 200. From the carrier sense signal 202, the switch system knows how long the packet is and can therefore notify other controllers and processes to efficiently handle or route packet 200 to the designated destination or destinations according to DA information 206.

Referring now back to FIG. 1, according to one embodiment of the present invention, switch system 100 further comprises queue mangers 106, SSRAM controller 108, an Address Translation Engine (ATE) 110, an MDIO/MDC Management Interface 112, and an LED Interface 114.

Queue managers 106 comprise a free queue manager, an enqueue controller, a multicast queue manager, and a port queue manager. The free queue manager provides a mechanism to monitor the number of free buffers remaining in external memory SSRAM 118 and to assign a free queue buffer, if there are any in SSRAM 118, to an input port that receives an inbound packet and hence requests for a free space in SSRAM 118. In addition, the free queue manager maintains a free queue linked list (registers) for a next free queue buffer address and updates the free queue linked list after a packet is delivered.

The enqueue controller arbitrates between requests for enqueuing from the input ports. As described above, there are typically two kinds of packets, unicast packets and broadcast packets. It should be noted that multicast packets might be treated as broadcast packets but with multiple DA information therein. When the enqueue controller receives a request signal from an input port that just received an inbound packet, it enqueues an unicast packet into an output queue for the output port the packet is destined to or multiple output queues for multiple ports the packet is destined to but in the same cycle.

The multicast queue manager maintains a multicast queue linked list and manages to update multicast queue entries in the list. The multicast queue entries are identifiers of the ports to which a multicast packet is sent. Typically, a multicast queue entry comprises an enqueue address so that there is no need for the free queue manager to dequeue a multicast packet when the multicast packet is respectively delivered from each of the output ports designated by the multicast packet.

The port queue manager manages output queues of each of the output ports and ensures that a packet is correctly routed to the appropriate output ports for subsequent delivery therethrough. After the packet is delivered, the port queue manager updates the output queues of the ports that have successfully delivered the packet. If the packet is a multicast packet, the port queue manager will inform the multicast queue manager to update the multicast queue linked list.

Further descriptions of operations of the free queue manager, the enqueue controller, the multicast queue manager, and the port queue manager in queue managers 106 are provided when an embodiment of the present invention is discussed below.

SSRAM stands for Synchronous Static Random Access Memory. SSRAM controller 108 is directly coupled to external memory SSRAM 118 that has typically a capacity of 64K×32 bits. SSRAM 118 is primarily used to store inbound packets as well as an address table for respective addresses in the packets and for the destination ports. For example, when a packet from one of the stations on network 104 arrives, the packet is first parsed for address information such as DA and SA therein for identification of corresponding ports. The address information DA, SA and port identifications are then stored in SSRAM 118. The use of the external memory eliminates the need of maintaining a large memory buffer in system 100.

SSRAM controller 108 in system 100 provides a necessary interface between SSRAM 114 and system 100 for data communication therebetween. According to one embodiment, SSRAM 118 runs at 66 MHz and the data is 32 bits. Accordingly, SSRAM 118 can provide up to 2.1 G bandwidth that is sufficient for eight ports to access data at full duplex speed. In addition, SSRAM 118 may have a capacity of 2 Mega bit (64K×32) and be partitioned into 2K bytes so that it can store the maximum length of a packet under the current Ethernet standard. With the given length, SSRAM 118 can accommodate over 100 packets at any time. To efficiently place a packet in and retrieve the packet from SSRAM 118, each packet is stored in a location collectively identified by an address.

ATE 110 performs address management including address searching, address learning, and address aging. Address searching process determines which output port an incoming packet should be forwarded based on the DA information in the packet. Address learning process determines where an arrived packet comes from, typically from the SA information in the packet. Address aging process ensures that if a node (i.e. to which a station is coupled) is inactivated for a certain period, for example, more than 5 minutes, it is disconnected and its corresponding entry in the address table is removed.

To minimize the time it takes to forward an arrived packet to a right output port or ports for delivery, one of the important features of the present invention is queue managers 106 that are provided to manage both enqueuing process of locations of arrived packets stored in an external memory and dequeuing process of the locations after the packets are successfully transmitted. More detailed description on the enqueuing and dequeuing processes will be provided below. As used herein, enqueue or enqueuing means a record of an entry by queuing the entry into a list, dequeue or dequeuing manes a removal of an entry from a list.

MDIO/MDC Management Interface 112 is shared among MAC ports 116 and determines status of each of MAC ports 116, wherein MDIO stands for Management Data Input/Output and MDC stands for Management Data Clock. Each of MAC ports 116 can be coupled to any one of client device 102, wherein MAC stands for Media Access Controller that manages data flow going through a data link between system controller 100 and a respective client device.

Another one of the important features in the present invention is LED interface 114. It provides multiple status information to users. Unlike LED displays in many conventional systems, the present invention uses a minimum number of LEDs to convey full status information of a particular port in ports 116 and will be described in detail below.

Figure 3A:
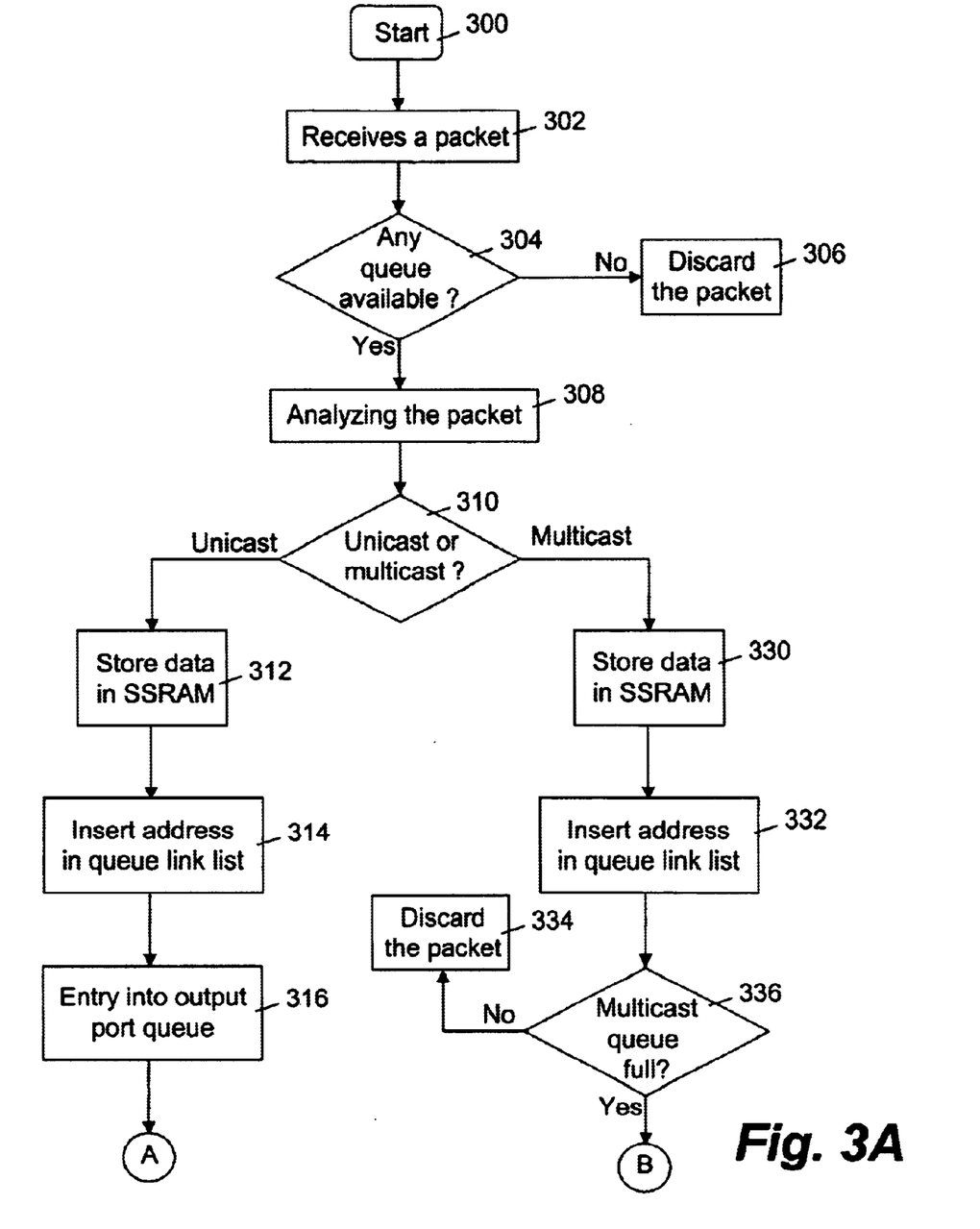
FIGS. 3A and 3B together show a process flowchart of the present invention according to one embodiment.
Figure 3B:
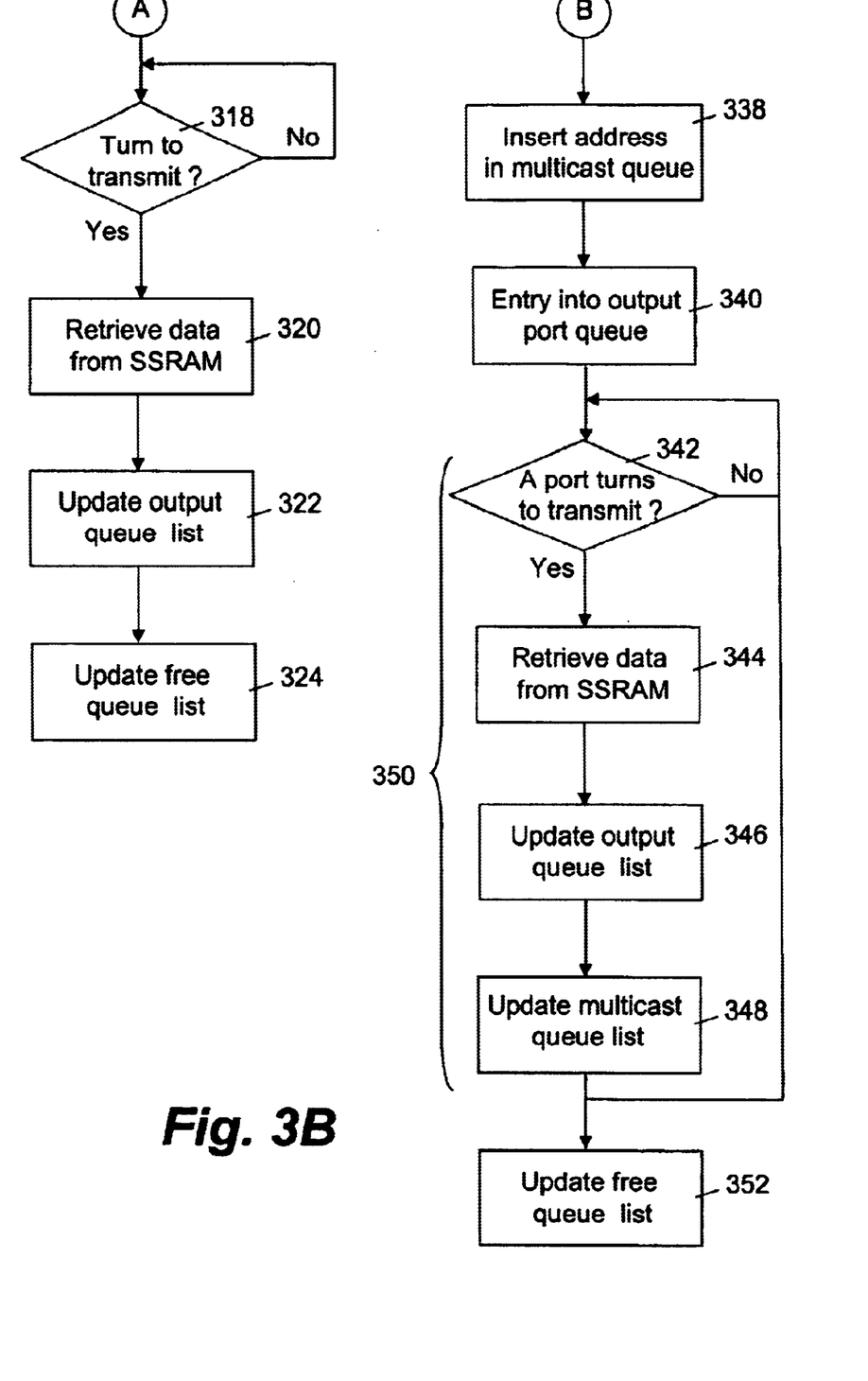

Referring now to FIGS. 3A and 3B together, there is shown a process flowchart of the present invention according to one embodiment. FIGS. 3A and 3B should be understood in conjunction with FIGS. 1 and 2 and subsequent illustrative detailed figures. At 302, one of the ports 116 receives an inbound packet that may come from any stations 102 on network 104. The packet may represent a portion of an electronic file transmitted from an origin station to a destination station, for example, an email is sent from origin station 102-2 to destination station 102-8. As illustrated in FIG. 2, the packet includes DA information and SA information. Upon detecting the first few bits of the packet, the MAC port sends a request to queue managers 106 for enqueuing the packet, the request may also include information about the nature of the packet, a unicast packet versus a multicast packet or a broadcast packet.

More specifically, the free queue manager in queue managers 106 must first determine if external memory SSRAM 118 can accommodate the newly arrived packet. For various reasons, the external memory may become full and therefore can not take in any newly arrived packets. The reasons that cause the external memory to be full may include a low capacity of the memory and a high traffic of inbound packets. To determine the availability of the external memory, at 304, the free queue manager in queue managers 106 determines if the free queue linked list has exceeded a predefined length that is typically the number of locations in the external memory that can store packets. As described above, the free queue linked list corresponds to and tracks the capacity status of the external memory. If the free queue linked list does exceed the predefined length, the received packet is dropped at 306 and the origin station that sent the packet will resend the packet per the common communication protocol (e.g. TCP) till the packet is actually taken.

If the free queue manager in queue managers 106 finds out that the free queue linked list can accommodate a new entry, the packet is received and subsequently analyzed for address information at 308. The process at 308 may include parsing the packet to get the DA and SA information, to verify that the received packet is complete, optionally to determine how long (in terms of bits) the packet is, and extract other information that may be needed for efficient and correct delivery of the packet.

At 310, it is determined if the received packet is for unicast and multicast (including broadcast). Generally, if the packet is for unicast, the DA information is explicitly expressed in terms of an identification, such as device address 128.12.234.19 to which the packet should be sent. If the packet is for multicast, the DA information may comprise multiple addresses, each respectively identifying a port to which a designated station is connected. Further if the packet is for broadcast, the DA information may not have an explicit address or may have just a specific code that indicates the packet is for every station on the network.

Depending on the nature of the packet, queue managers 106 handle the packet differently as described in the following.

The Packet is for Unicast

At 312, the packet is caused to transport to SSRAM 118 through SSRAM controller 108 for temporary storage. It should be noted that there may be several ways to store the packet. One possible way is to store the parsed information, for example, DA, SA, and the actual data extracted from the packet are stored respectively, which may allow the switch system to amend the DA information in the received packet with locally assigned destination address to the station that is supposed to receive the packet. Another possible way is to simply store the packet intact in the external memory. It should be noted the way the packet is stored does not affect the operation of the present invention. Regardless, every location in the external memory is addressable, which means once a location is occupied by data or a packet, an address to the location must be managed well in order to later retrieve the data or the packet efficiently for fast delivery.

Figure 4A:
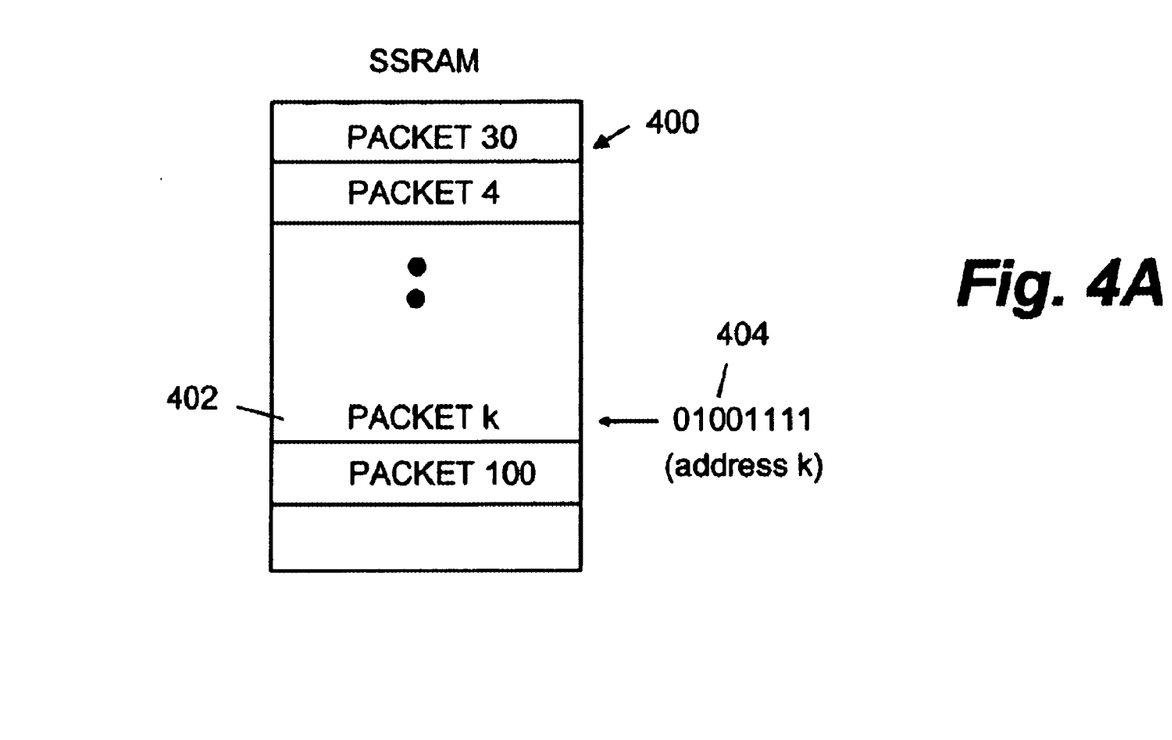
FIG. 4A illustrates a layout of the external memory in which a newly arrived packet is inserted and a corresponding address identifying the location is obtained and returned to an enqueue controller in queue managers to start the enqueuing process.
Figure 4B:
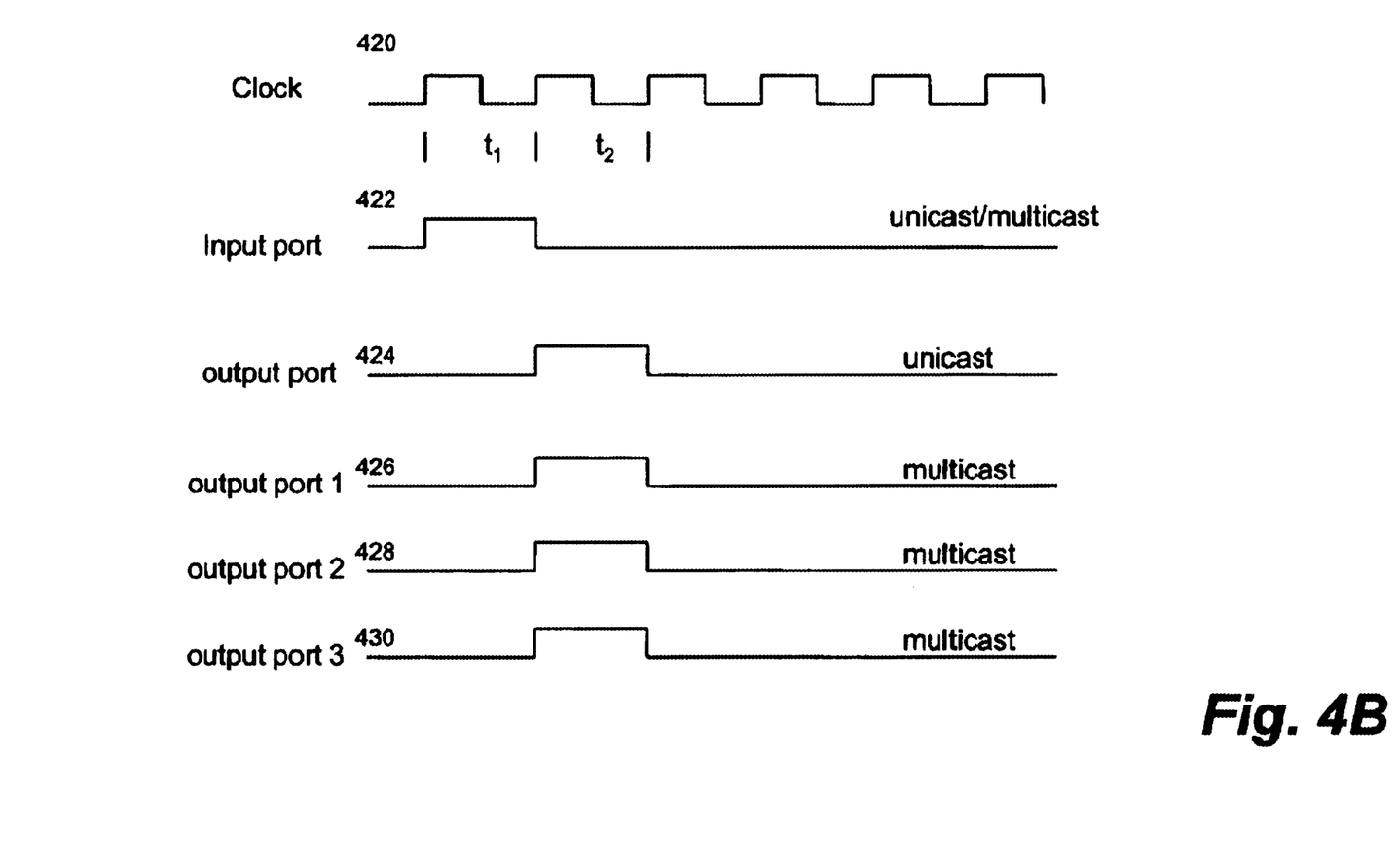
FIG. 4B illustrates a set of timing diagram for the enqueuing and dequeuing processes and should be understood in conjunction with FIG. 4A.

FIG. 4A illustrates a layout of external memory 400 in which a newly arrived packet 402 is inserted and a corresponding address 404 identifying the location is obtained and returned to the enqueue controller in queue managers 106 to start the enqueuing process. It should be noted that all the memory locations in memory 400 are reusable, which means that once a packet is delivered, the location occupied by the packet become available for a new packet. FIG. 4B illustrates a set of timing diagram for the enqueuing and dequeuing processes and should be understood in conjunction with FIG. 4A. Given address 404, the enqueue controller determines an appropriate queue linked list to manage the address. In cycle t1, address 404 is inserted into the free queue linked list. As seen in FIG. 4B, information or pointers to the stored packet are queued immediately, in the next cycle t2, into respective output queues.

Figure 4C:
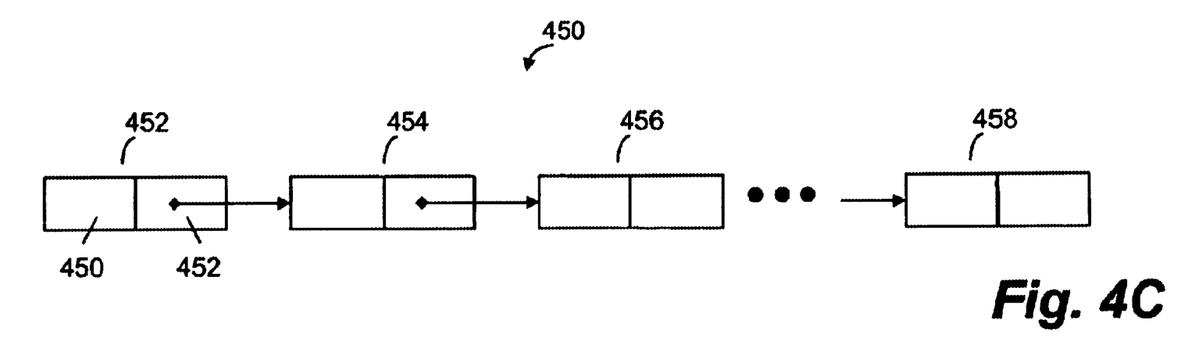
FIG. 4C illustrates a free queue linked list according to one embodiment of the present invention.
Figure 4D:
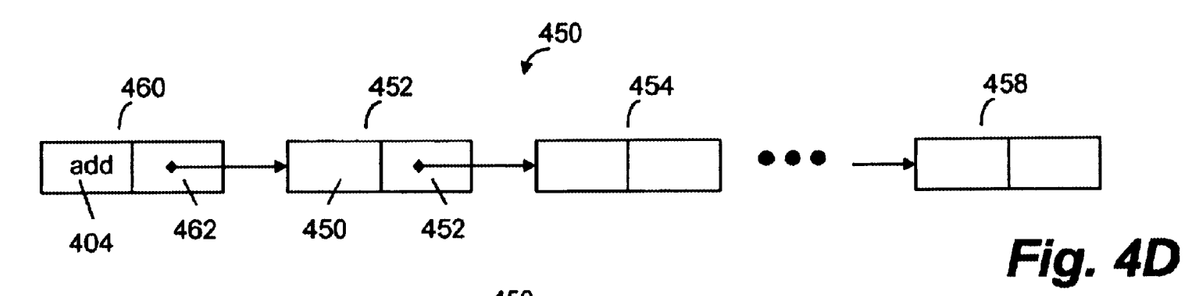
FIG. 4D shows free queue linked list after an address (element) is added thereto.

To illustrate the process of enqueuing the addresses of all the received (inbound) packets stored in SSRAM 118, FIG. 4C illustrates a free queue linked list 450 according to one embodiment of the present invention. Each element 452, 454, 456 . . . or 458 in linked list 450 must have at least two fields: a field including an address at which a packet is stored in SSRAM 118, i.e. value of the element and a link field indicating the location of the next element. In particular, element 452 comprises value of the element 450 that includes an address of a memory location in SSRAM 118 and link field 452 contains an address of the location of following linked element 454. FIG. 4D shows free queue linked list 450 including a new element 460 containing address 404 after an arrived packet is placed in location 402 of FIG. 4A. It is understood, the length of free queue linked list 450 can not exceed the predefined length which is typically the maximum number of packets the external memory can accommodate.

Referring now back to FIG. 3, at 314, the address that indicates where the arrived packet is stored in SSRAM 118 is inserted into free queue linked list 450 as shown in FIG. 4D. It can be perceived that there are many packets coming from and going to different ports, each must be buffered in SSRAM 118 and may be released for delivery at any time. When a packet is successfully delivered, the location once occupied by the packet immediately becomes available for a newly arrived packet, using a free queue linked list to dynamically manage the addresses of the packets in SSRAM 118 is one of the features in the present invention and has many advantages and benefits that will be further appreciated in the description below.

As described above, the port queue manager in queue manage 106 maintains a number of output queues, each for one output port. At 316, an entry that points the packet stored in SSRAM 118 is entered into an output port queue for delivery. When one entry is turned to be delivered at 318, the entry causes the packet stored in SSRAM 118 to be moved back to system 100 through in SSRAM controller 108 and forwarded to the output port for subsequent delivery at 320. At 322, the output queue is updated upon the port queue manager receiving a signal that the packet is successfully delivered. Further the port queue manager informs the free queue manager to update the free queue linked list at 324.

Figure 4E:
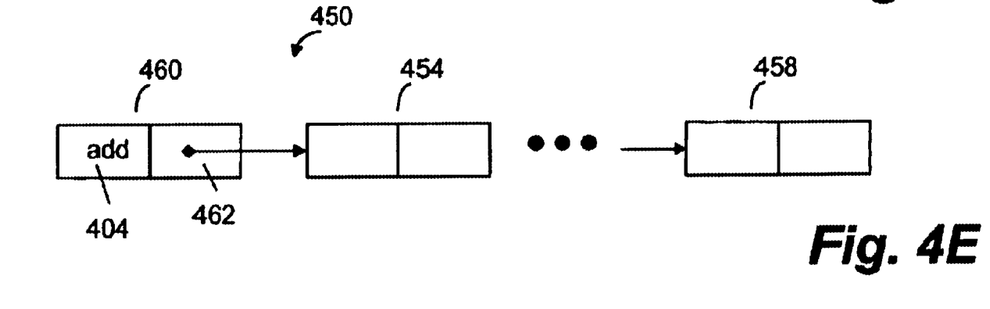
FIG. 4E illustrates the updated linked list with an element removed.

The update of the free queue linked list is the dequeuing process undertaken by the free queue manager. From the prospective of the free queue linked list, any element in the list can be removed after a corresponding packet is successfully delivered. This is to recycle the memory locations and reuse the memory locations. When an element is removed from the list, the link field in the element behind the removed element must be updated with a pointer to the element pointed by the removed element. FIG. 4E illustrates the updated linked list with element 452 removed. It is noted that the link field in element 460 has been changed.

By now those skilled in the art may appreciate the use of a free queue linked list managed by the free queue manager in conjunction with the port queue manager. At any time, an entry is entered to the free queue linked list (i.e. the enqueuing process), the port queue manager takes over immediately to monitor the corresponding output queue for a designated output port. If the packet is delivered provided there is no traffic in the port, the free queue linked list can be updated (i.e. the dequeuing process) in the next cycle t2 as shown in FIG. 4B. This reduces any possible latency in a switch system to a munimim.

The Packet is for Multicast (Broadcast)

The process to handle a multicast packet starts at 330 and 332 that are similar to processes at 312 and 314 for unicast packet. For simplicity, processes 330 and 332 are not to be recited. As the packet is now for multiple ports in switch system 100, one of the tasks that the multicast queue manager in queue managers 106 does is to map the ports to which the multicast packet is meant to send. For example, a multicast packet received is meant for three stations on network 104 of FIG. 1 and the three stations are respectively coupled to ports 102-2,102-4, and 102-5. Each of the stations has an unique address that may be one of the three addresses included in the DA information of the received packet. Meanwhile each of ports 102-2,102-4, and 102-5 has an unique identifier known by system 100. Therefore a mapping relationship called MQMAP is created to ensure that the multicast packet is correctly forwarded to the right ports. The MQMAP may be structured as a look-up-table with one-to-one entries so given an address of a station, a corresponding port identifier is located.

For a multicast or broadcast packet that may be delivered immediately by one of the ports and meanwhile queued for other ports, the multicast queue manager enqueues dynamically the identifiers of the ports. In other words, the multicast queue manager is responsible to ensure the packet is delivered to every port of the ports designated by the packet by maintaining a multicast queue linked list. Therefore at 336, the multicast queue linked list is looked up to ensure that it can accommodate a newly arrived multicast or unicast packet. If the multicast queue linked list is not readily accepting a new packet, the newly arrived multicast packet is dropped at 334.

If the multicast queue linked list is determined that it can accommodate a new entry, the port identifiers are respectively and sequentially inserted in the multicast queue linked list at 338. The structure of the multicast queue linked list is similar to that of the free queue linked list shown in FIG. 4C, except the value of the element is the port identifier.

At 340, an entry that points the packet stored in SSRAM 118 is entered into an output port queue for delivery. When one entry is turned to be delivered at 342, the entry causes the packet stored in SSRAM 118 to be moved back to system 100 through SSRAM controller 108 and forwarded to the port for subsequent delivery at 344. As described, each output port maintains its own output queue collectively managed by the port queue manager. When one of the ports successfully delivers a multicast packet, the corresponding output queue is updated at 346. The port queue manager instructs the multicast queue manager to update the multicast queue list at 348. The multicast queue list is updated by the multicast queue manager to delete the port identifier out of the multicast queue list, another dequeuing process.

If not every one of the designated ports by the multicast or broadcast packet has successfully delivered the packet, process 350 repeats till all of the ports deliver the packet. Then the free queue manager updates the free queue linked list at 352 so that newly arrived packets can be continuously accommodated by the external memory.

Figures 5A, 5B, 5C, 5D:
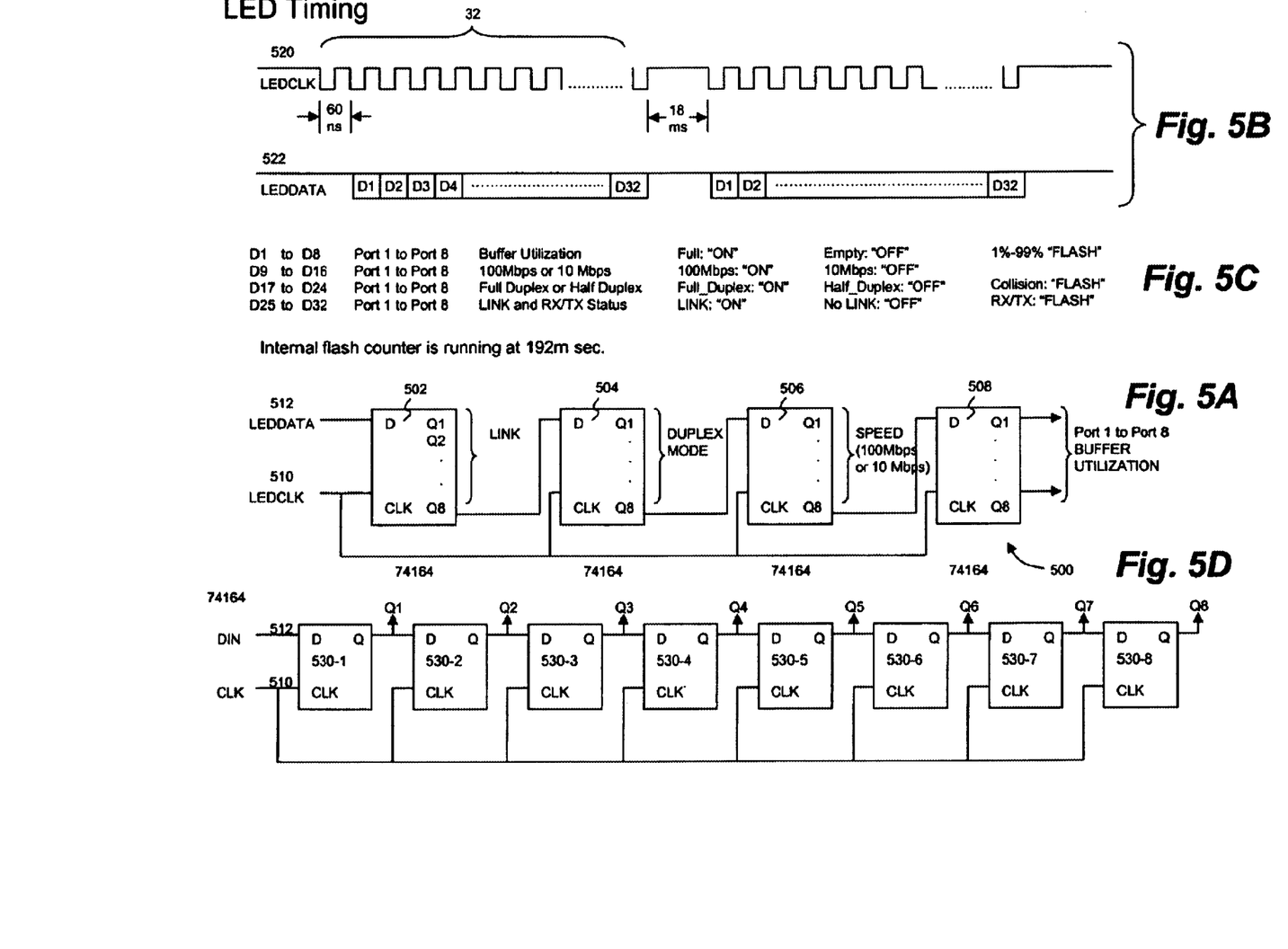
FIG. 5A illustrates a shift circuitry that is interfaced with an LED interface of FIG. 1, the shift circuitry comprising a plurality of shift circuits.
FIG. 5B illustrates a timing diagram that can be used to drive a circuitry in FIG. 5A.
FIG. 5C lists status data to be displayed on LEDs (Light Emitting Diode) in detail according to one embodiment.
FIG. 5D shows an example of using a series of shift registers to implement one of the shift circuits used in FIG. 5A.

Referring now to FIG. 5A, there is illustrated a circuitry 500 that is interfaced with LED interface 114 of FIG. 1. To convey status information of switch system 100 to a user using a minimum number of inputs to LEDs is one of the features in the present invention. For a switch system with eight ports as shown in the figure, there are four shift circuits 502, 504, 506, and 508, which are concatenated in series. Shift circuit 502 receives a clocking signal 510 and a data signal 512. Clocking signal 510 can be provided from a clocking source, such as an oscillating circuit, in system 100 of FIG. 1. Data signal 512 is provided from a circuitry that collects status information about all the ports of system 100 and the circuitry implementation is known to those skilled in the art. The circuitry is often referred to as a display interface in the art and more particularly referred to as an LED interface when the status information is to be displayed on LEDs.

FIG. 5B illustrates a timing diagram of signals 520 and 522 that can be used to drive circuitry 500 in FIG. 5A. LEDCLK 520 is a clocking signal as one of the two inputs to circuitry 500 and LEDDATA 522, another input to circuitry 500, is the data signal comprising the status information that needs to be displayed on the LEDs.

To be more specific, LEDDATA 522 comprises groups of status signals or pulses, which means status signals come periodically as a group. According to the embodiment shown in the figure, each status group includes 8 consecutive status signals that corresponds respectively eight groups of four LEDs in each. In other words, each of the status signals is displayed on one of four LEDs in each of the eight groups as such a user can visualize one kind of status for each of the ports. FIG. 5C lists each of the data in detail according to the embodiment and specifically illustrates a first group of status signals representing the buffer utilization, a second group of status signals representing the port speed, a third group of status signals representing the port mode, and a fourth group of status signals representing link status; of each of the eight ports.

Referring back to FIG. 5A, LEDDATA 512 is serially shifted from one of the shift circuits to another one of the shift circuits according to LEDCLK 510. For each shift through a shift circuit, one group of status signals is present for display as each of the shift circuit includes eight outputs. FIG. 5D shows one implementation of the shift circuit used in FIG. 5A. The shift circuit comprises a number of shift registers 530 connected in series (i.e. a local shift circuit). According to the particular embodiment shown in the figure, each of shift registers 530 is coupled to a display indicator that displays particular information depending on the pulses in LEDCLK 512. Conventionally, each of the display indicators is an LED but can be replaced by other display apparatus as well and the local shift circuits are typically implemented with shift registers, such as a commonly known serial-in and parallel-out 74164 shift register.

As described above, data signal 512, or LEDDATA 522, is provided to shift circuit 502 and then serially shifted from one shift circuit to another according to the clocking signal 510 or LEDCLK 520. Within each shift circuit, the data signal is serially shifted from one local shift circuit to another as such one group of status signals can be respectively displayed on the LEDs that are coupled respectively to the local shift circuits in each shift circuit.

The collaboration between the pulses in LEDCLK 520 and the data in LEDDATA 522 ensures each status can be correctly parsed and displayed on the appropriate LEDs. It should be pointed out that the exact number of LEDs in use and the nature of the status to be shown on the LED do not affect the operation of the present invention. Typically an LED has a pair of inputs, the important feature herein is to utilize the limited inputs to convey a number of information to a user in a serial fashion collaborated with a dedicated clocking signal.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for displaying port statuses of a switch system having N ports, the method comprising:
   receiving a clocking signal and a data signal, the data signal comprising M groups of status information, each of the M groups of status information comprising N status signals, each of the N status signals corresponding to one of the N ports of the switch system;
   providing the data signal to M shift circuits connected in series, each of the M shift circuits providing N outputs, wherein the N outputs are respectively coupled to N display indicators, each for one of the N ports of the switch system;
   producing each of the M groups of status information by shifting the data signal through the M shift circuits in synchronization with the clocking signal; and
   causing the N status signals in each of the M groups status information to be displayed simultaneously on the N indicators.

2. The method as recited in claim 1, wherein each of the M shift circuits further comprises N local shift circuits, each of the N local shift circuits providing one of the N outputs so that the N status signals can be respectively displayed on the N display indicators.

3. The method as recited in claim 2, wherein each of the N local shift circuits is a shift register, and each of the M shift circuits comprises a group of N shift registers.

4. The method as recited in claim 3, wherein each of the N display indicators is an LED.

5. The method as recited in claim 4, wherein each of the N status signal is a binary pulse, and wherein the data signal comprises a plurality of binary pulses.

6. The method as recited in claim 5, wherein the data signal shifting comprising producing sequentially and respectively the M groups of status information.

7. The method as recited in claim 1,
   wherein the data signal comprises N×M status signals, and the N status signals are shifted as a group through one of the M shift circuits; and
   wherein each of the N status signals respectively displayed on one of the N display indicators.

8. The method as recited in claim 7, wherein each of the M shift circuits further comprises N local shift circuits, each of the N local shift circuits coupled to one of the N display indicators.

9. The method as recited in claim 8, further comprising distributing the N status signals respectively to the N display indicators for display.

10. A circuit architecture for displaying port statuses of a switch system having a plurality of ports, the circuit architecture comprising:
    a plurality of display indicators;
    a plurality of shift circuits connected in series and receiving a clocking signal and a data signal, the data signal comprising groups of status signals and provided by a display interface in the switch system;
    each of the shift circuits comprising a plurality of local shift registers and each of the local shift registers coupled to one of the display indicators; and
    wherein the groups of status signals are distinctly separated in the shift circuits, each of the shifting circuits producing one of the groups of status signals that are respectively displayed on the display indicators when the data signal is serially shifted from one of the shift circuits to another one of the shift circuits according to the clocking signal; and
    wherein each of the status signals in the one of the groups of status signals is displayed on one of the display indicators when the one of the groups of status signals is serially shifted from one of the local shift registers to another one of the local shift registers according to the clocking signal.

11. The circuit architecture as recited in claim 10, wherein each of the display indicators is an LED.

12. A circuit architecture for displaying port statuses of a switch system having N ports, the circuit architecture comprising:
    M LEDs for each of the N ports so there are N×M such LEDs; M shift circuits connected in series and receiving a clocking signal and a data signal, the data signal comprising M groups of status signals and provided by a display interface in the switch system;
    each of the M shift circuits, producing one of the M groups of status signals, comprising N local shift registers and each of the local shift registers coupled to one of the LEDs for each of the N ports; and
    wherein each of the M groups of status signals includes N respective status signals for the N ports, the N respective status signals are simultaneously displayed N LEDs for the N ports when the data signal is serially shifted from one of the M shift circuits to another one of the M shift circuits according to the clocking signal; and
    wherein each group of the M groups of status signals includes a status for each of the N ports, the status being selected from a group consisting of buffer utilization, duplex use, speed use and a use of the switch system itself.

13. The method as recited in claim 1, wherein each of the M shift circuits is configured to provide one of the M groups of status information.

14. The method as recited in claim 13, the M groups of status information include a status of buffer utilization for each of the N ports.

15. The method as recited in claim 13, wherein the M groups of status information include a status of full or half duplex for each of the N ports.

16. The method as recited in claim 1, wherein the M groups of status information include a status of full or half duplex for each of the N ports.

17. The circuit architecture as recited in claim 10, wherein the groups of status signals include a status of buffer utilization for each of the N ports.

18. The circuit architecture as recited in claim 10, wherein the groups of status signals include a status of full or half duplex for each of the N ports.

19. The circuit architecture as recited in claim 12, wherein each of the M shift circuits is configured to provide one of the M groups of status information.

20. The circuit architecture as recited in claim 19, wherein one of the N ports receives a data packet that is designated to be routed to another one of the N ports or a group of ports of the N ports depending upon whether the data packet is for unicast or multicast.

* * * * *